(12) United States Patent
Chun

(10) Patent No.: US 9,335,649 B2
(45) Date of Patent: May 10, 2016

(54) MAKING A LIQUID ELECTROPHOTOGRAPHIC (LEP) PASTE

(75) Inventor: Doris Chun, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/397,019

(22) PCT Filed: May 31, 2012

(86) PCT No.: PCT/US2012/040198
§ 371 (c)(1),
(2), (4) Date: Oct. 24, 2014

(87) PCT Pub. No.: WO2013/180716
PCT Pub. Date: Dec. 5, 2013

(65) Prior Publication Data
US 2015/0111149 A1    Apr. 23, 2015

(51) Int. Cl.
| | |
|---|---|
| G03G 9/16 | (2006.01) |
| G03G 9/12 | (2006.01) |
| G03G 9/125 | (2006.01) |
| G03G 9/13 | (2006.01) |
| C09D 11/033 | (2014.01) |
| C09D 11/037 | (2014.01) |
| C09B 67/46 | (2006.01) |
| C09B 67/00 | (2006.01) |
| C09D 17/00 | (2006.01) |

(52) U.S. Cl.
CPC .............. *G03G 9/122* (2013.01); *C09B 67/009* (2013.01); *C09B 67/0086* (2013.01); *C09B 67/0088* (2013.01); *C09B 67/0098* (2013.01); *C09D 11/033* (2013.01); *C09D 11/037* (2013.01); *C09D 17/004* (2013.01); *G03G 9/12* (2013.01); *G03G 9/125* (2013.01); *G03G 9/13* (2013.01)

(58) Field of Classification Search
CPC ....................................................... G03G 9/16
See application file for complete search history.

(56) References Cited

U.S. PATENT DOCUMENTS

| | | |
|---|---|---|
| 4,794,651 A | 12/1988 | Landa et al. |
| 4,842,974 A | 6/1989 | Landa et al. |
| 5,037,475 A | 8/1991 | Chida et al. |
| 5,047,307 A | 9/1991 | Landa et al. |

(Continued)

FOREIGN PATENT DOCUMENTS

| | | |
|---|---|---|
| JP | 2006039475 | 2/2006 |
| WO | WO 96/31808 | 10/1996 |

(Continued)

OTHER PUBLICATIONS

Supplementary European Search Report for Application No. EP12877917.0 dated Dec. 23, 2015, 9 pages.

(Continued)

*Primary Examiner* — Hoa V Le
(74) *Attorney, Agent, or Firm* — Dierker & Associates, P.C.

(57) ABSTRACT

A method of making a liquid electrophotographic (LEP) paste is disclosed herein. A base paste is made by forming a dispersion of a pigment and a non-polar carrier, adding a transparent resin dispersion to the pigment dispersion to form a dispersion mixture, and homogenizing the dispersion mixture. The transparent resin dispersion includes a polymer dispersed in a non-aqueous carrier. The homogenizing may be accomplished by agitating the dispersion mixture at a frequency of less than 1 kHz, thereby forming the paste.

6 Claims, 8 Drawing Sheets

(56) References Cited

U.S. PATENT DOCUMENTS

| | | |
|---|---|---|
| 5,047,603 A | 9/1991 | Pardini |
| 5,192,638 A | 3/1993 | Landa et al. |
| 5,208,130 A | 5/1993 | Almog et al. |
| 5,225,306 A | 7/1993 | Almog et al. |
| 5,240,806 A | 8/1993 | Tang et al. |
| 5,264,313 A | 11/1993 | Landa et al. |
| 5,266,435 A | 11/1993 | Almog |
| 5,286,593 A | 2/1994 | Landa et al. |
| 5,300,390 A | 4/1994 | Landa et al. |
| 5,346,796 A | 9/1994 | Almog |
| 5,407,771 A | 4/1995 | Landa et al. |
| 5,554,476 A | 9/1996 | Landa et al. |
| 5,655,194 A | 8/1997 | Landa et al. |
| 5,792,584 A | 8/1998 | Almog |
| 5,923,929 A | 7/1999 | Ben Avraham et al. |
| 6,146,803 A | 11/2000 | Landa et al. |
| 6,376,147 B1 | 4/2002 | Bonsignore et al. |
| 6,740,316 B2 | 5/2004 | Tournilhac et al. |
| 7,560,215 B2 | 7/2009 | Sharma et al. |
| 7,938,901 B2 | 5/2011 | Wheeler et al. |
| 2004/0233262 A1 | 11/2004 | Randler et al. |
| 2006/0222985 A1 | 10/2006 | Tsubuko et al. |
| 2007/0048642 A1 | 3/2007 | Hsieh |
| 2008/0113195 A1 | 5/2008 | Boll et al. |
| 2009/0250164 A1 | 10/2009 | Carrle et al. |
| 2010/0095868 A1 | 4/2010 | Kaupp et al. |
| 2011/0104441 A1 | 5/2011 | Bhattacharyya |

FOREIGN PATENT DOCUMENTS

| | | |
|---|---|---|
| WO | WO-2011/003442 | 1/2011 |
| WO | WO 2012/057800 | 5/2012 |

OTHER PUBLICATIONS

Yanko, Chris E., "Integrating Digital Printing Technology into a Fiexographic Environment", 2009 Forecast: Technology, Trends, Tactics, Sec. 2-Print Production Process, 3 pgs.

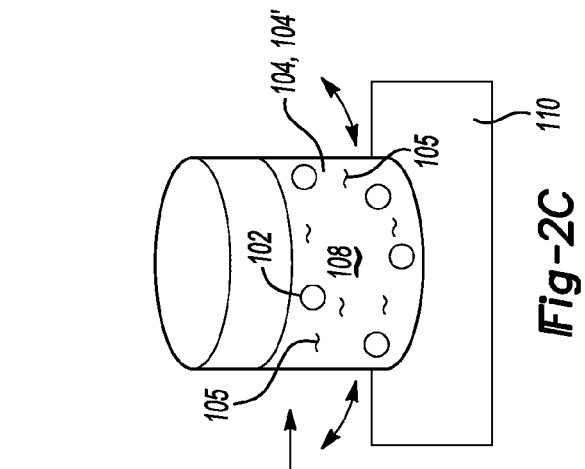
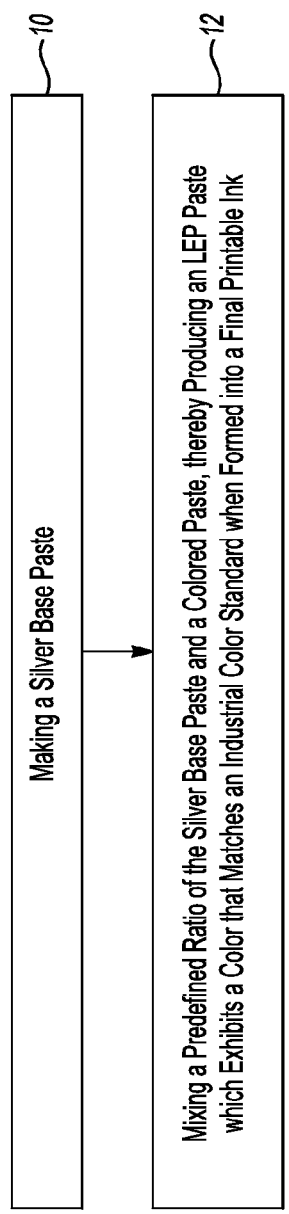
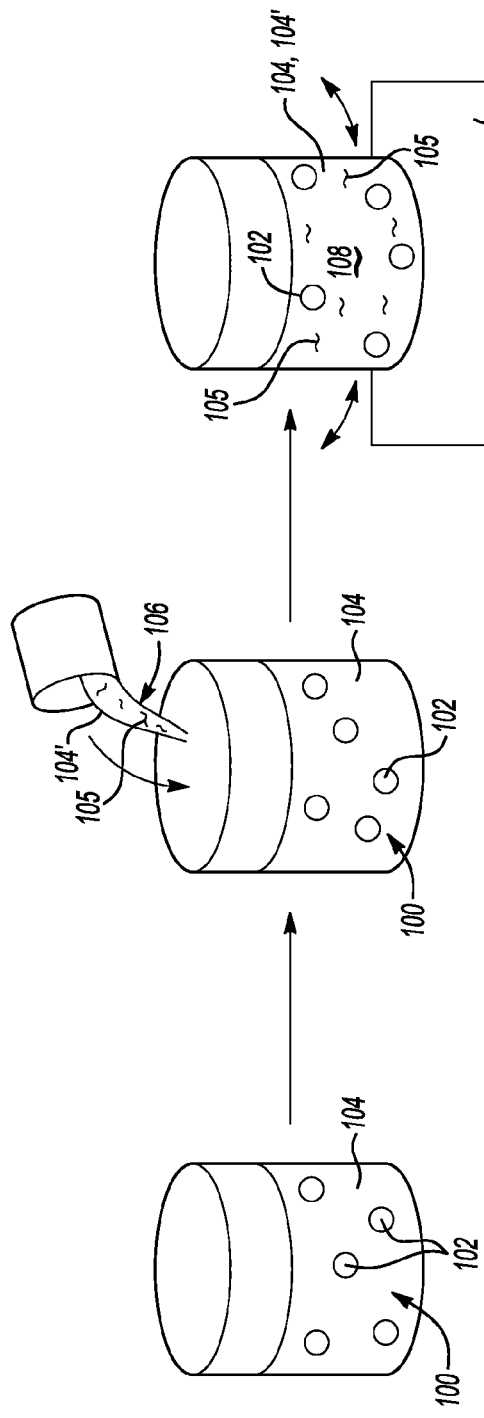

MAKING A LIQUID ELECTROPHOTOGRAPHIC (LEP) PASTE

BACKGROUND

Liquid electrophotographic (LEP) printing techniques often utilize printable inks that contain a colorant dispersed in a liquid medium. In some instances, the colorant includes pigment particles of a primary color, and these pigment particles tend to exhibit a color by absorption of light.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in conjunction with other drawings in which they appear.

FIG. 1 is a flow diagram depicting an example of a method of making an LEP paste;

FIGS. 2A through 2C, together, schematically depict an example of a method of making a silver base paste;

DETAILED DESCRIPTION

Figures 3A, 3B:
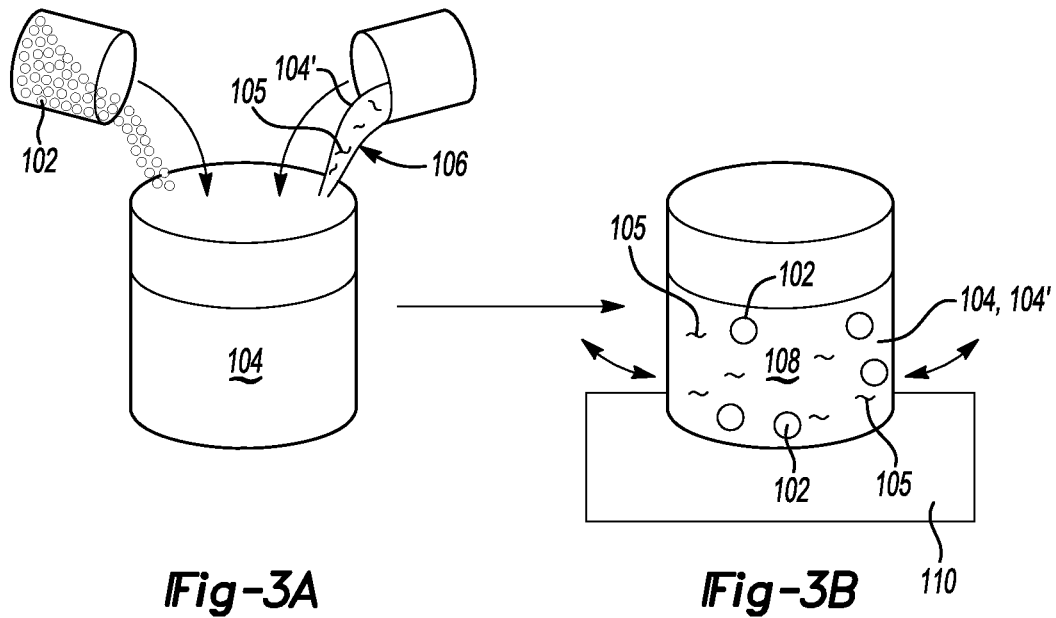
FIGS. 3A and 3B, together, schematically depict another example of a method of making a silver base paste.

The present disclosure relates generally to methods of making a liquid electrophotographic (LEP) paste.

Examples of the method as disclosed herein may be used to form an LEP paste. In an example, the LEP paste is a mixture of a base paste (e.g., a silver base paste) and a colored paste, and the LEP paste may be formed by combining a predetermined ratio of the silver base paste with the colored paste. In another example, the LEP paste is the base paste alone. For any of these examples, the LEP paste may then be combined with a charge director, and may be diluted with a non-polar carrier to form a printable LEP ink.

The inventor of the present disclosure has found that examples of the printable LEP ink, when printed, produce images on a medium (e.g., paper, plastic, etc.) that have a brilliant silver appearance. Without being bound to any theory, it is believed that the brilliant silver appearance of the images is due to the individual pigment particles of examples of the silver base paste (which makes up all or part of the LEP paste used to from the printable LEP ink) having a pigment morphology that is conducive to maximum reflectance of light. The inventor has found that this pigment morphology is the same as, or substantially similar to the original morphology of the pigment particles (i.e., the morphology of the pigment particles as they are produced by the manufacturer).

Accordingly, examples of the present disclosure include examples of a method for making the silver base paste that include processing steps that are gentle on the pigment so that the pigment can retain its original morphology. Examples of the silver base paste formed by this method exhibit a desirably sharp, silver metallic color. Examples of printable LEP inks produced from the example LEP pastes exhibit a metallic color (e.g., metallic red, metallic blue, metallic green, etc.) having a brilliant, silver shine. In fact, the color of examples of the printable LEP inks according to the present disclosure also matches industrial color standards, e.g., a Pantone® metallic color standard (Pantone LLC, Carlstadt, N.J.).

It is believed that the LEP printing of examples of the present LEP printable ink may be more economical and efficient than, e.g., the printing of non-metallic inks onto a metallic substrate. For instance, when the metallic substrate does not have a silver background, the substrate may have to be modified by forming a non-metallic background and then producing desired color patterns over the modified background to achieve a desirable look. The non-metallic background may be created, e.g., by masking the metallic background with a white ink to produce white ink layer(s) on the metallic substrate. In some instances, however, the metallic substrate may reflect through the white ink layer(s). Further, modification of the metallic substrate may be laborsome, and some challenges may arise with color matching and/or ink usage when colored inks are printed on the metallic substrate. In contrast, the LEP printable inks disclosed herein may be printed on a variety of substrates (e.g., plain paper, coated paper, polyethylene terephthalate (PET) transparencies, label stocks, synthetic paper, etc.) to achieve a desired color that matches industrial color standards.

The inventor has further found that the examples of the metallic LEP ink produced by the examples of the method disclosed herein are printable by a digital printing system (e.g., digital printing presses).

An example of a method of making an example of the LEP paste will now be described herein with reference to FIG. 1. In this example, a silver base paste is made at step 10, and then a predefined ratio of the silver base paste is mixed with a colored paste to produce the LEP paste at step 12. The LEP paste formed exhibits a color that matches an industrial color standard when formed into a final printable LEP ink. It is to be understood that the silver base paste alone is also an LEP paste. The silver base paste (without another colored paste added thereto) may be diluted to form a printable silver ink. As such, the term LEP paste may include a silver base paste alone, or in combination with another colored paste. In the example method of FIG. 1, the LEP paste is a mixture of the silver base paste and another colored paste.

Examples of processes for making the silver base paste in step 10 will now be described herein. An example process is shown in FIGS. 2A through 2C (i.e., the FIG. 2 Series), and another example process is shown in FIGS. 3A and 3B (i.e., the FIG. 3 Series).

Referring now to the example process shown in the FIG. 2 Series, the process includes forming a silver dispersion 100. The silver dispersion 100 may be formed, e.g., in a container, by dispersing a colorant 102 in a non-polar carrier 104. It is to be understood that the silver dispersion 100 is a paste, and not a fluidic liquid. As used herein, a paste refers to a material having a soft and malleable consistency. The step for forming the silver dispersion 100 is shown in FIG. 2A.

The colorant 102 for the silver dispersion 100 may be a pigment, and in one example, the pigment may be chosen from a pigment having a silver appearance. Examples of pigments having a silver appearance include those that contain aluminum, such as aluminum pigment particles, encapsulated aluminum pigment particles, aluminum pigment flakes, and aluminum pigment powders. Other examples of pigments having a silver appearance include silver pigments, chromium pigments, and platinum pigments. Some metal alloys and metal oxides also exhibit a silver (and, in some instances, pearlescent) appearance. Examples of suitable metal alloys include titanium alloys. Examples of suitable metal oxides include iron oxide, mica with or without a titanium dioxide coating, and zinc oxide with a titanium oxide coating. In this example method, the pigment is present in the silver dispersion 100 in an amount ranging from about 20 wt % to about 60 wt % of the silver dispersion 100. In another example, the pigment is present in the silver dispersion 100 in an amount ranging from about 30 wt % to about 45 wt %.

The pigment may otherwise be a combination of a pigment having a silver appearance and another pigment having a pearlescent optical property. The pigment having the silver appearance may be chosen from any of the pigments identified above. The pigment having the pearlescent optical property may be chosen from pigments that tend to exhibit various colors depending on the angle of illumination and/or viewing. The pearlescent optical property may be observed, e.g., by visual inspection of the various colors at varying angles of illumination and/or viewing. Examples of pigments having a pearlescent optical property include silica coated with aluminum pigment, metal oxide coated mica, nanocrystalline cellulose, copper-zinc pigment platelets, and large (e.g., greater than 30 µm) aluminum flakes. In the examples where a combination of pigments having a silver appearance and pigments having a pearlescent appearance are used, the amount of the pigment having the silver appearance ranges from about 20 wt % to about 60 wt % of the silver dispersion 100, and the amount of the pigment having the pearlescent optical property ranges from about 5 wt % to about 30 wt % of the silver dispersion 100. In other examples, the amount of pigment having the silver appearance in the combination ranges from about 30 wt % to about 45 wt %, and/or the amount of the pigment having the pearlescent optical property in the combination ranges from about 5 wt % to about 15 wt %.

It is to be understood that some of the examples of the pigments having a silver appearance and the pigments having a pearlescent optical property mentioned above are self-dispersible pigments. Examples of such pigments include pearlescent pigments of the PHOENIX® family (e.g., PHOENIX® PX 1000, PHOENIX® PX 1001, PHOENIX® PX 1221, PHOENIX® PX 1231, PHOENIX® PX 1241, and PHOENIX® PX 1251) and pearlescent pigments of the LUXAN® family (e.g., LUXAN® C001, LUXAN® C261, LUXAN® D393, LUXAN® E001, LUXAN® E221, LUXAN® E241, LUXAN® E261, LUXAN® E271, and LUXAN® F001). The pigments of the PHOENIX® family and of the LUXAN® family are available from Eckart Effect Pigments, Hartenstein, Germany. The self-dispersible pigment(s) may be dispersed in the non-polar carrier without a dispersant. Other examples of the pigments having a silver appearance and the pigments having the pearlescent optical property are non-self-dispersible pigments. Examples of non-self-dispersible pigments include, for example, the aluminum pigments, silver pigments, chromium pigments, platinum pigments, metal alloy pigments, metal oxide pigments, silica coated with aluminum pigment, nanocrystalline cellulose, copper-zinc pigment platelets, etc. These non-self-dispersible pigments may be dispersed in the non-polar carrier in the presence of a dispersant.

Examples of dispersants that may be used to disperse any of the non-dispersible pigments in the non-polar carrier include those that are at least partially soluble in the non-polar carrier. For example, if the carrier is ISOPAR® L, then the dispersant(s) may be selected so that it/they are soluble in the ISOPAR® L. In an example, the dispersant(s) may be selected from anionic dispersants, cationic dispersants, amphoteric dispersants, non-ionic dispersants, polymeric dispersants, oligomeric dispersants, crosslinking dispersants, or combinations thereof.

Examples of anionic dispersants include sulfosuccinic acid and derivatives thereof such as, for instance, alkyl sulfosuccinates (e.g., GEROPON® SBFA-30 and GEROPON® SSO-75, both of which are manufactured by Rhodia, Boulogne-Billancourt, France) and docusate sodium.

Examples of cationic dispersants include quaternary amine polymers, protonated amine polymers, or polymers containing aluminum (such as those that are available from Lubrizol Corp., Wickliffe, Ohio). Further examples of cationic dispersants include SOLSPERSE® 2155, 9000, 13650, 13940, and 19000 (Lubrizol Corp.) and other like cationic dispersants.

Amphoteric dispersants include those that contain compounds having protonizable groups and/or ionizable acid groups. An example of a suitable amphoteric dispersant includes lecithin.

Examples of non-ionic dispersants include oil-soluble polyesters, polyamines, polyacrylates, polymethacrylates (such as, e.g., SOLSPERSE® 3000 (Lubrizol Corp.), SOLSPERSE® 21000 (Lubrizol Corp.), or the like).

Examples of oligomeric dispersants include low average molecular weight (i.e., less than 1000) non-ionic dispersants.

Examples of cross-linking dispersants include, but are not limited to, polymers or oligomers containing two or more carbon double bonds (C=C) and free amine groups such as, e.g., polyamines, crosslinkable polyurethanes, and divinyl benzene.

Other suitable dispersants include OS#13309AP, OS#13309AQ, 14179BL, and 45479AB from Lubrizol Corp, which are dispersants based on polyisobutylene succinic acid with polyethyleneimines. These dispersants are combination polymers that are cationic in nature.

In instances where a dispersant is used, the amount of dispersant present in the silver dispersion 100 ranges from about 1 wt % to about 25 wt % of the silver dispersion 100. In another example, the amount of dispersant present ranges from about 5 wt % to about 10 wt % of the silver dispersion 100.

When self-dispersible pigment(s) is/are used, the silver dispersion 100 may be formed by dispersing the self-dispersible pigment(s) in the non-polar carrier. The self-dispersible pigment(s) may be dispersed in the non-polar carrier, e.g., using a gentle stirring or mixing technique. When one or more non-self-dispersible pigments is/are used (even if the silver dispersion 100 also includes one or more self-dispersible pigments), the silver dispersion 100 is formed slightly differently. For instance, the silver dispersion 100 may be formed by adding a dispersant to the non-polar carrier, and then adding the non-self-dispersible pigment to the non-polar carrier/dispersant mixture. Dispersing the pigment in the non-polar carrier in the presence of the dispersant may involve some processing, such as microfluidization, sonication, milling, grinding, and/or shaking. It is to be understood that any of these processes (even high shearing processes, such as microfluidization, milling, and grinding) may be used to disperse the pigment in the non-polar carrier to form the silver dispersion 100 under controlled conditions without affecting the morphology of the pigment. For example, these high shear processes may be operated at relatively low frequencies and have enough dispersion energy to disperse the pigment because in the absence of resin, the viscosity is low. It is believed that the variety of high and low shearing processes may be used to form the silver dispersion 100 because there is no resin present in the silver dispersion 100. When resin is present, the viscosity is significantly increased and more energy may be required to disperse both pigment and resin. The increase in energy is believed to contribute to pigment breakdown. Since resin is not present when forming the silver dispersion 100, the high shearing processes may be used to form the silver dispersion without deleteriously affecting the pigments.

The non-polar carrier 104 for the silver dispersion 100 is chosen from a hydrocarbon, examples of which include isoparaffinic hydrocarbons, paraffinic hydrocarbons, aliphatic hydrocarbons, de-aromatized hydrocarbons, halogenated hydrocarbons, cyclic hydrocarbons, functionalized hydrocarbons, and combinations thereof. Functionalized hydrocarbons include hydrocarbons functionalized with alcohols, acids, esters, ethers, sulfonic acids, sulfonic acid esters, etc.). The hydrocarbon may be an aliphatic hydrocarbon, an isomerized aliphatic hydrocarbon, branched chain aliphatic hydrocarbons, aromatic hydrocarbons, and combinations thereof.

Some examples of the non-polar carrier 104 include ISOPAR® G, ISOPAR® H, ISOPAR® K, ISOPAR® L (as previously mentioned), ISOPAR® M, ISOPAR® V, NORPAR® 12, NORPAR® 13, NORPAR® 15, EXXOL® D40, EXXOL® D80, EXXOL® D100, EXXOL® D130, and EXXOL® D140, all of which are available from Exxon-Mobil Corp., Houston, Tex.

Further examples of the non-polar carrier 104 include TECLEN® N-16, TECLEN® N-20, TECLEN® N-22, NISSEKI NAPHTHESOL® L, NISSEKI NAPHTHESOL® M, NISSEKI NAPHTHESOL® H, Solvent H, Solvent L, Solvent M, NISSEKI ISOSOL® 300, NISSEKI ISOSOL® 400, AF-4, AF-5, AF-6, and AF-7 (all of which are available from Nippon Oil Corp., Tokyo, JP); IP Solvent 1620 and IP Solvent 2028 (both of which are available from Idemitsu Petrochemical Co., Ltd., Tokyo, JP); AMSCO® OMS and AMSCO® 460 (both of which are available from American Mineral Spirits Co., Los Angeles, Calif.); and Electron, Positron, New II, and Purogen HF (all of which are available from Ecolink Co., Tucker, Ga.).

The amount of non-polar carrier 104 makes up the balance of the silver dispersion 100.

As shown in FIG. 2B, a transparent resin dispersion 106 is then added to the silver dispersion 100. These dispersions 100, 106 together form a dispersion mixture 108 shown in FIG. 2C. The transparent resin dispersion 106 is prepared separately from the silver dispersion 100, and the transparent resin dispersion 106 includes a polymer 105 dispersed in a non-aqueous carrier 104'. It is to be understood that the transparent resin dispersion 106 does not include a pigment, and may be referred to as a "white" dispersion.

The polymer 105 for the transparent resin dispersion 106 is chosen from a thermoplastic resin. Examples of thermoplastic resins include ethyl vinyl acetate copolymers (such as those of the ELVAX® family available from E.I. du Pont de Nemours & Co.), ethylene copolymers having a carboxylic acid functionality (such as those of the ELVAX II® family available from E.I. du Pont de Nemours & Co., examples of which include ELVAX II 5720 and ELVAX II 5610), polybutyl terephthalate, ethylene ethyl acrylate (such as those of the BAKELITE® family available from Union Carbide, examples of which include DPD 6169, DPDA 6182 Natural, and DTDA 9169), ethylene vinyl acetate (such as DQDA 6479 Natural 7 and DQDA 6832 Natural 7), and methacrylate resins (such as those of the ELVACITE® family including polybutyl methacrylate (Grade 2044), polymethyl methacrylate (Grade 2028), and polymethyl methacrylate (Grade 2041) available from E.I du Pont de Nemours & Co.).

The polymer 105 may be present in an amount ranging from about 15 wt % to about 40 wt % of the transparent resin dispersion 106. In another example, the polymer 105 may be present in an amount ranging from about 20 wt % to about 25 wt % of the transparent resin dispersion.

The non-aqueous carrier 104' of the transparent resin dispersion 106 is a non-polar liquid that may be chosen from any of the examples of the non-polar carrier 104 of the silver dispersion 100 identified above. In one example, the non-aqueous carrier 104' of the transparent resin dispersion 106 is the same as the non-polar carrier 104 of the silver dispersion 100 (e.g., both the non-aqueous carrier and the non-polar carrier may be chosen from ISOPAR® L). In another example, the non-aqueous carrier 104' of the transparent resin dispersion 106 is different from the non-polar carrier 104 (e.g., the non-aqueous carrier 104' may be ISOPAR®L, and the non-polar carrier 104 may be TECLEN® N-16). It is to be understood that the non-aqueous carrier 104' of the transparent resin dispersion 106 and the non-polar carrier 104 of the silver dispersion 100 may be different as long as the two carriers are miscible and both are non-conductive.

In an example, the non-aqueous carrier 104' makes up the balance of the transparent resin dispersion 106.

Referring back to the drawings, and as previously mentioned, the dispersion mixture 108 shown in FIG. 2C is formed by the combination of the silver dispersion 100 and the transparent resin dispersion 106. Also during the step shown in FIG. 2C, the dispersion mixture 108 is homogenized by agitating the dispersion mixture 108 for a predetermined time. Agitation may be performed or controlled at room temperature (e.g., from about 22° C. to about 25° C.) (i.e., no heat is applied during homogenization). Further, agitation of the dispersion mixture 108 is accomplishing using a gentle shaking process occurring at a low agitation frequency of less than or equal to 1 kHz. The low agitation frequency may be as low as 1 Hz (0.001 kHz). The agitation process disclosed herein is unlike high shearing processes, such as microfluidization, that tend to break down the pigment and change its morphology when performed in the presence of a resin. The gentleness of the shaking process is also accomplished by performing the shaking utilizing equipment where no moving parts physically contact the dispersion mixture 108. In this way, the agitation process is a non-impact process.

In an example, agitation of the dispersion mixture 108 may be accomplished by shaking the mixture 108, such as by pivotal shaking, orbital shaking, rotational shaking, pneumatic shaking, or combinations thereof. Shaking may be accomplished, for instance, by grasping the container containing the dispersion mixture 108 by a person's hand, and then moving the container (in a non-violent manner that coincides with a shaking frequency of less than or equal to 1 kHz) from side to side, from front to back, in circles, etc. to perform the homogenization of the dispersion mixture 108. In another example, the container may be placed on an agitator 110 set to a low frequency (again, less than or equal to 1 kHz), and the dispersion mixture 108 may be homogenized by the agitator 110.

It is to be understood that homogenization is accomplished by agitation alone. In other words, no other processing steps are used to homogenize the dispersion mixture 108. It is further to be understood that the silver base paste is formed after homogenization of the dispersion mixture 108 is complete. Completion of homogenization of the dispersion mixture 108 may be determined by visual inspection. For instance, the silver dispersion 100 is a silvery-gray color and the transparent resin dispersion 106 is white. Homogenization is considered to be complete when patches of discrete regions of the two dispersions 100, 106 can no longer be seen inside the container within which the two dispersions 100, 106 are mixed. Visual inspection may be accomplished while watching the dispersion 100, 106 mix during the shaking/agitating through a transparent container, or by stopping the shaking/agitating periodically and opening the container to see if any discrete patches of the two dispersions 100, 106 remain.

Upon homogenizing the silver dispersion 100 and the transparent resin dispersion 106, it is believed that the silver base paste (i.e., the homogenized dispersion mixture 108) will include a combination of pigment particles that are embedded in the resin of the transparent resin dispersion and pigment particles that are not embedded in the resin.

Another method of forming the silver base paste will now be described with reference to the FIG. 3 Series. This method is substantially the same as the method described with reference to the FIG. 2 Series, however the steps described with reference to FIGS. 2A and 2B are combined into a single step. For example, as shown in FIG. 3A, the colorant 102 (which may be a self-dispersible pigment dispersed in the non-polar carrier, or a non-self-dispersible pigment dispersed in the non-polar carrier by a dispersant) and the transparent resin dispersion 106 (including polymer 105 and non-aqueous carrier 104') are added to the non-polar carrier 104 at the same time to form the dispersion mixture 108. The dispersion mixture 108 is then homogenized via agitation, as shown in FIG. 3B, to form the silver base paste. The homogenization process is the same for the step shown in FIG. 3B as was previously described for the step shown in FIG. 2C.

Examples of the silver base paste formed by examples of the present method include a carrier (e.g., the combination of the non-polar carrier 104 of the silver dispersion 100 and the non-aqueous carrier 104' of the transparent resin dispersion 106), a colorant 102 dispersed in the carrier, and a polymer 105 (i.e., the polymer 105 from the transparent resin dispersion 106) also dispersed in the carrier 104, 104'.

The pigment particles of the example silver base paste individually have a morphology that is the same as, or substantially similar to the original morphology of the pigment particles before processing. For example, when the silver base paste includes aluminum pigment particles (e.g., silver dollar aluminum pigment), the morphology of the particles have a flat and round morphology, resembling a "silver dollar". This is shown in a scanning electron microscope (SEM) image of a print sample in FIG. 4B, and will be described in detail below in Example 1.

It is to be understood that the pigment of examples of the silver dispersion 100, and thus of the example silver base paste may have a morphology that is different from the silver dollar aluminum pigment. To achieve the desirable brilliant, metallic appearance, retention of the original morphology of the pigment is desirable, despite what the original morphology is. For instance, if the original morphology of the particles resembles flat rods or fibers, then after processing of the example silver base paste, the morphology of the pigment should still resemble flat rods or fibers.

To achieve the brilliant, metallic appearance, the pigment should lie in a plane parallel/substantially parallel to a surface upon which the example silver base paste (either alone or when incorporated into another LEP paste or an LEP printable ink) is established/printed. In an example, the pigment lies in a plane parallel/substantially parallel when the plane is no more than 20 degrees from the surface upon which the example silver base paste is established/printed. It is believed that the orientation of the pigment in this manner may be achieved when the pigment retains its original morphology during the processing of the silver base paste, as well as during the processing of other LEP pastes utilizing the silver base paste. An example of the orientation of the pigment particles that lies in a plane parallel/substantially parallel to the surface of the medium is also shown in the SEM images in FIG. 4B, as well as in FIG. 5A. FIG. 5A will be described in detail below in conjunction with Example 2.

Additionally, for pigments that tend to have random and/or irregular morphologies, the original morphology of the pigment may be retained, e.g., by maintaining a particle size distribution and/or a particle thickness distribution during processing of the silver base paste. It is believed that maintaining the morphology in this manner may contribute to the brilliance of the metallic color of a printed metallic LEP ink including an example of the silver base paste as a component thereof. In an example, the pigment size distribution should be substantially the same before and after processing, where the particle size ranges from about 200 nm to about 20 μm. In another example, the pigment thickness distribution before and after processing should be substantially the same before and after processing, where the thickness of the particles ranges from about 100 nm to about 250 nm. In yet another example, retention of the morphology (i.e., the morphology of the pigment is the same as, or substantially similar to the original morphology of the pigment particles before processing) may also be accomplished when the change in particle size distribution (which tends to change as soon as the particle morphology breaks down) before and after processing is less than a standard deviation of 2. At a standard deviation of 2 or more, at least some deleterious effects of the morphology of the pigment particles may be evident.

Changes in the particle size distribution and/or the particle thickness distribution before and after processing of the silver base paste may be used, in combination with changes in the pigment shape, as an indicator of pigment deterioration. The inventor has found that such deterioration of the pigment leads to a deviation from maximum light reflectance of the pigment due, at least in part, to different orientations of the pigment fragments and internal scattering of incident light. In this way, the LEP ink including the deteriorated pigment generally darkens and loses the luster required to meet an industrial color standard.

In contrast, a metallic LEP ink including an example of the silver base paste of the present disclosure, when printed on a medium, exhibits a color that does match an industrial color standard. As will be shown in Examples 3 and 4 below, examples of the metallic LEP ink, when printed on a non-metallic substrate, matches Pantone® color standards. To match the industrial standards, the metallic LEP ink, when printed on a sheet of paper, generally has flop index ranging from about 8 to about 12 and an optical density ranging from about 0.05 to about 0.08.

Referring back to the example described in conjunction with FIG. 1, at step 12, a predefined ratio of the example silver base paste is mixed with a colored paste to produce an example of the metallic LEP paste. Any of the examples of the silver base paste described above may be used to produce examples of the metallic LEP paste. The colored paste includes pigment particles incorporated in a non-aqueous vehicle. In some instances, the colored paste may further include a charge director, which induces a charge to the pigment particles. In these instances, the pigment in the colored paste may be said to be charged pigment particles. In other instances, a charge director may be added to a printable metallic LEP ink formed from the metallic LEP paste, and thus the pigment particles of the colored paste are not charged at the time the colored paste is made. The pigment particles of the colored paste are subsequently charged, by virtue of the charge director, upon forming the metallic LEP ink.

The non-aqueous vehicle for the colored paste may be chosen from any of the non-polar carriers 104 identified above for the silver base paste. Further, the non-aqueous vehicle for the colored paste may be the same as or different from the non-polar carrier 104 of the silver base paste. In instances where the non-aqueous vehicle is different from the non-polar carrier 104, the non-aqueous vehicle and the non-polar carrier 104 should be miscible and non-conductive. Further, the non-aqueous vehicle for the colored paste may include one or more additives, examples of which include binders, surfactants, biocides, etc. The additive(s) may be used so long as the additive(s) do not contribute to the overall conductivity of the colored paste. For instance, the conductivity of the colored paste should remain below 20 pico mho (pmho, or pico-Siemens) at a negligible DC current (e.g., less than 10 mV).

The colorant for the colored paste may be chosen from one or more pigments. The pigment(s) may be self-dispersible in the non-aqueous vehicle, or may be chosen from non-self-dispersible pigments. In an example, the colored paste includes the non-aqueous vehicle and the pigment alone (i.e., without a dispersant). In another example, the colorant may be chosen from pigment particles that are non-self-dispersible in the vehicle. In this example, the colored paste may include one or more dispersants in addition to the vehicle and the colorant.

Examples of the pigments disclosed herein may include organic pigment particles or inorganic pigment particles. The organic or inorganic pigment particles may be selected from black pigment particles, yellow pigment particles, magenta pigment particles, red pigment particles, cyan pigment particles, blue pigment particles, green pigment particles, orange pigment particles, brown pigment particles, and white pigment particles. In an example, the pigment may be chosen from a spot-color pigment, which is formed from a combination of a predefined ratio of two or more primary color pigment particles.

An example of a suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J. (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Examples of suitable magenta or red organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Some examples of brown organic pigments include C.I. Pigment Brown 1, C.I. Pigment Brown 5, C.I. Pigment Brown 22, C.I. Pigment Brown 23, C.I. Pigment Brown 25, and C.I. Pigment Brown, C.I. Pigment Brown 41, and C.I. Pigment Brown 42.

Suitable examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

In another example, the pigment may be a specialty pigment, such as a metallic pigment. These pigments include a metal selected from gold, silver, platinum, nickel, chromium, tin, zinc, indium, titanium, copper, aluminum, and alloys of any of these metals. The metals may be used alone or in combination with two or more metals, metal oxides, or metal alloys. Examples of metallic pigments include Standard RO100, Standard RO200, and DORADO PX™ 4001 (available from Eckart Effect Pigments, Wesel, Germany).

Other examples of pigments that may be used as the colorant include inorganic particles, such as alumina, titanium dioxide, mica, and zinc oxide.

In an example, the amount of the pigment(s) present in the colored paste ranges from about 10 wt % to about 50 wt % of the colored paste, and in another example, the amount of pigment(s) present ranges from about 20 wt % to about 30 wt % of the colored paste. Further, the non-aqueous vehicle makes up the balance of the colored paste.

One or more of the pigment(s) mentioned above may be incorporated into the non-aqueous vehicle to produce an LEP paste having a desired color. Some examples of the LEP paste that may be produced include cyan pastes, magenta pastes, yellow pastes, black pastes, violet pastes, green pastes, and orange pastes.

In an example, the colored paste is one of green, orange, or violet pastes for creating spot colors. Examples of these colored pastes are commercially available under the trade name HP IndiChrome® paste from Hewlett Packard Indigo. It is believed that other colors may be obtained utilizing the inks of the ElectroInk® family also available from Hewlett Packard Indigo. The ElectroInks® include a cyan ElectroInk®, a magenta ElectroInk®, a yellow ElectroInk®, a black ElectroInk®, a violet ElectroInk®, a green ElectroInk®, and an orange ElectroInk®.

In one example, a violet metallic LEP paste may be formed by a ratio of about 70 parts of the silver base paste and about 30 parts of a violet colored paste. A darker shade of violet may be formed, for example, by combining a larger amount of the violet colored paste (e.g., greater than 30 parts) with a smaller amount of the silver base paste (e.g., less than 70 parts). Likewise, a lighter shade of violet may be achieved by combining a smaller amount of the violet paste (e.g., smaller than 30 parts) with a larger amount of the silver base paste (e.g., larger than 70 parts). In another example, the metallic LEP paste includes from about 30 parts to about 90 parts of the silver base paste, and about 10 parts to about 70 parts of the colored paste. In still another example, the metallic LEP paste includes from about 70 parts to about 80 parts of the silver base paste, and about 20 parts to about 30 parts of the colored paste.

It is to be understood that the colored paste may be one colored paste, or a combination of two or more colored pastes. In the latter instance, the total parts of colored paste would be all of the pastes added together. For example, the LEP paste may include 80 parts of the silver base paste, about 5 parts of a magenta colored paste, and about 15 parts of a yellow colored paste.

Referring again to step 12 of FIG. 1, the mixing of the silver base paste and the colored paste(s) may be accomplished using any of the mixing techniques described above for forming the silver base paste, such as by agitating using gentle shaking. In an example, the mixing is accomplished for a period of time that is relative to the total amount of non-volatile solids (NVS) present in the metallic LEP paste (i.e., the silver base paste plus the colored paste). In an example, the total amount of NVS in the metallic LEP paste ranges from about 20 wt % to about 35 wt % of the LEP paste. In another example, the amount of NVS ranges from about 22 wt % to about 25 wt % of the metallic LEP paste. In instances where the NVS of the LEP paste ranges from about 25 wt % to about 28 wt %, mixing should take place for about 40 minutes per kilogram of the LEP paste. It is to be understood that the mixing time may be reduced when the total NVS is lower, and thus the LEP paste is thinner. For example, the mixing time may be reduced to about 20 minutes per kilogram of the LEP paste when the LEP paste includes about 23 wt % NVS.

As noted above, it is to be understood that the silver base paste alone may be used to form an example of the LEP paste. In other words, in some examples, the silver base paste is not combined with a colored paste to form the LEP paste. In this example, the total amount of non-volatile solids (NVS) present in the metallic LEP paste would include the NVS present in the silver base paste alone.

A printable metallic LEP ink may then be formed from the metallic LEP paste (which may be the combination of the silver base paste and the colored paste or the silver base paste alone) by diluting the metallic LEP paste with a non-polar carrier (e.g., the same as, or similar to/miscible with the non-polar carrier 104 of the silver base paste). Diluting may be accomplished by mixing the metallic LEP paste with an amount of additional non-polar carrier that is sufficient to dilute the metallic LEP paste into a printable metallic ink. In one example, the amount of additional non-polar carrier that is added to the metallic LEP paste is determined by the amount of LEP paste and the NVS of the LEP paste used to form the LEP ink. The amount of additional non-polar carrier added will form a printable LEP ink having a desired NVS content, which, in an example, ranges from about 1 wt % to about 4 wt %.

In an example, a charge director is added during the mixing of the metallic LEP paste with the additional non-polar carrier. The charge director is added to the metallic ink to induce a charge to the pigment, and may be chosen from one or more charging agents. Examples of charge directors that may be used include metal salts having polyvalent metal ions and organic anions as the counterion. Suitable metal ions include Ba, Ca, Mn, Zr, Cu, Al, Cr, Fe, Sb, Co, La, Pb, Mg, Mo, Ni, Ag, Sr, Sn, V, Y, and Ti. Suitable organic anions include carboxylates or sulfonates derived from aliphatic or aromatic carboxylic or sulfonic acids (such as aliphatic fatty acids including stearic acid, behenic acid, neodecanoic acid, diisopropylsalicylic acid, octanoic acid, abietic acid, naphthenic acid, octanoic acid, lauric acid, tallic acid, and the like). Positive charge directors may include metallic carboxylates, which include alkaline earth- and heavy-metallic salts of fatty acids containing at least 6 to 7 carbons, and cyclic aliphatic acids including naphthenic acid.

In an example, the printable metallic LEP ink may further include an additive, such as a slipping agent and/or a fatty acid. Examples of slipping agents include fatty acid amine esters such as erucamide, CRODAMIDE® (Croda International PLC, Edison, N.J.), ARGUSLIP® (Argus Additive Plastics GmbH, Buren, Germany), metal soaps such as aluminum stearates, silicon oils, waxes, paraffin oils, and glycols. Some fatty acids may have lubricating characteristics, and may be used in the ink formulation to modulate DC conductivity.

It is to be understood that the example methods of the present disclosure may also be used to form a non-silver LEP paste including other colored pastes, non-metallic pastes, and specialty colored pastes (e.g., white pastes, pearlescent pastes, gold pastes, fluorescent pastes, etc.). In an example, a method of making an LEP paste includes forming a pigment dispersion of a non-polar carrier and a pigment. Any examples of non-polar carriers and pigments disclosed herein may be used, and any of the dispersing techniques previously described for making the silver dispersion 100 may be used to disperse the pigments in the non-polar carrier to form the pigment dispersion of this example. A transparent resin dispersion is added to the pigment dispersion to form a dispersion mixture. The transparent resin dispersion includes a polymer dispersed in a non-aqueous carrier. Any examples of the polymer and non-aqueous carrier disclosed herein may be used. The dispersion mixture may then be homogenized, the homogenizing being accomplished by agitating the dispersion mixture at a frequency of less than or equal to 1 kHz, thereby forming the paste.

The agitating may be accomplished by pivotal shaking, orbital shaking, rotational shaking, pneumatic shaking, or combinations thereof. The agitating alone accomplishes formation of the paste. In other words, no other processing steps are used to homogenize the dispersion mixture. The gentleness of the shaking process is also accomplished by performing the shaking utilizing equipment where no moving parts physically contact the dispersion mixture. In this way, the agitation process is a non-impact process.

As with the example methods disclosed above, it is believed that the pigment morphology after processing is the same as, or substantially similar to the original morphology of the pigment particles (i.e., the morphology of the pigment particles as generated by the manufacturer).

Figure 8:
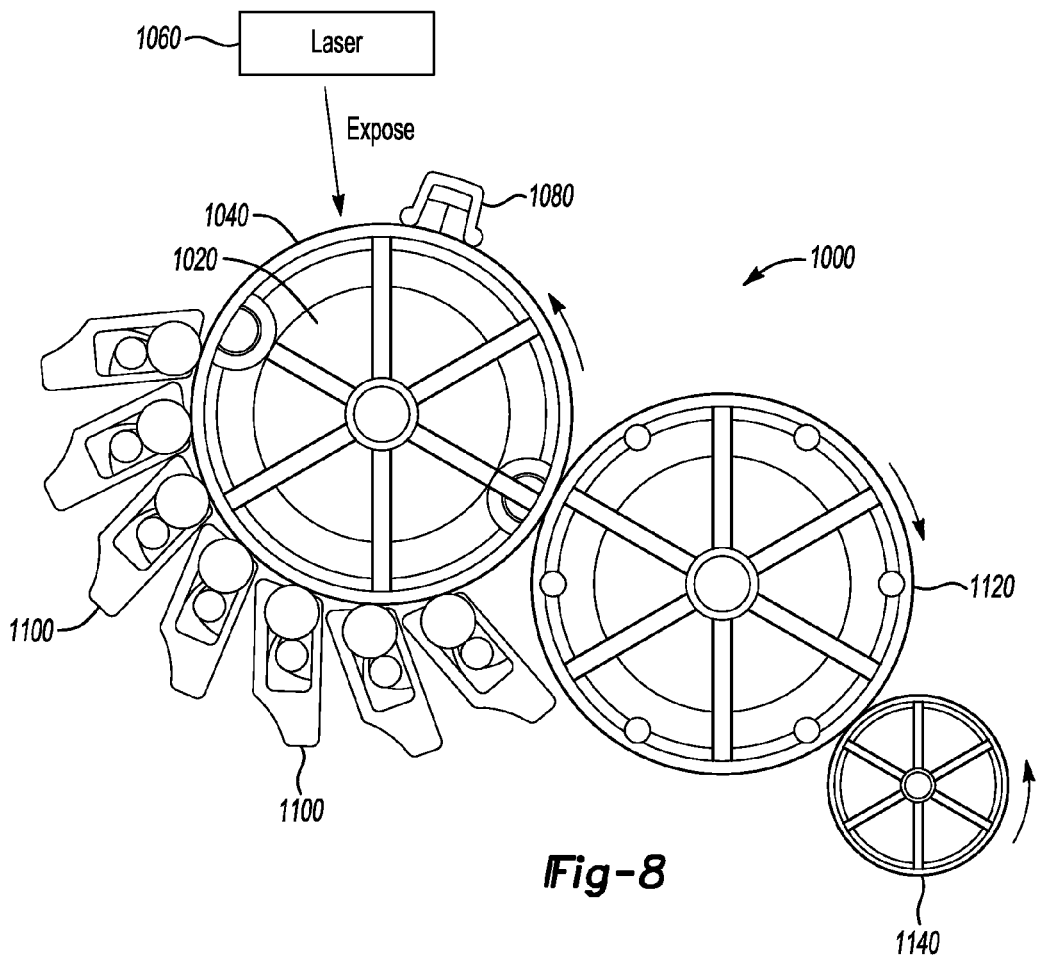
FIG. 8 is an example of a liquid electrophotographic (LEP) printing system for printing examples of the printable LEP ink of the present disclosure.

The printable metallic LEP ink (or non-metallic LEP in some examples) may be formed inside an LEP printing system. An example of an LEP printing system 1000 is shown in FIG. 8. The system 1000 includes a photoconductor/photo imaging plate (PIP) 1040 that is mounted to a rotating drum 1020. The photoconductor/PIP 1040 includes a surface that may be exposed to various elements of the system 1000 when the photoconductor/PIP 1040 is rotated.

The system 1000 further includes laser 1060 and a corona generator 1080, both of which are positioned adjacent to the surface of the photoconductor/PIP 1040. The laser 1060 is positioned such that as the drum 1020 rotates in the first direction, some of the areas of the photoconductor/PIP 1040 exposed to corona discharge from the generator 1080 are exposed to the emission from the laser 1060. The laser 1060 is selected so that its emission can generate charges opposite to those already present on the surface of the photoconductor/PIP 1040. By virtue of creating opposite charges, the laser 1060 effectively neutralizes the previously formed charges at areas exposed to the laser emission. This neutralization forms a latent image. It is to be understood that those areas of the surface of photoconductor/PIP 1040 not exposed to the laser remain charged.

A processor (not shown) operatively connected to the laser 1060 commands the laser 1060 to form the latent image so that the remaining charged portions of the surface of the photoconductor/PIP 1040 can be used to generate the desirable digital image. The processor is capable of running suitable software routines or programs for receiving desirable digital images, and generating commands for the corona generator 1080, binary ink developers (BIDs) 1100, and various components of the system 1000 including the photoconductor/PIP 1040, an intermediate transfer blanket 1120, an impression cylinder 1140, etc.

The system 1000 shown in FIG. 8 further includes at least one BID 1100 that is fluidically connected to an ink tank (not shown). The ink tank may include three chambers, one chamber to hold an example of the LEP paste (which was already formed offboard the system 1000), another chamber to hold the non-polar carrier, and still another chamber for mixing the LEP paste and non-polar carrier to generate a printable LEP ink (having the desirable NVS). In an example, the LEP paste in the chamber may be selected to include pigment particles carrying a charge that is opposite to that of the charged photoconductor/PIP 1040. In another example, the LEP paste in the chamber may be uncharged and the non-polar carrier may include a charge director that will introduce charge to the pigment(s) once the printable LEP ink is formed in the mixing chamber.

A roller in each of the BIDs 1100 is used to deposit a uniform layer of the printable LEP ink (i.e., the LEP paste diluted with the non-polar carrier) onto charged portions of the surface of the photoconductor/PIP 1040 during image development. It is to be understood that the charges remaining on the surface of the photoconductor/PIP 1040 after exposure to the laser will attract the oppositely charged LEP ink(s).

The ink is then transferred from the photoconductor/PIP 1040 to the intermediate transfer blanket 1120, and then a hardcopy material (e.g., paper or other print substrate) is brought directly into contact with the intermediate transfer blanket 1120 via the impression cylinder 1140, in order to transfer the image.

The printing system 1000 described above may be used to print the examples of the metallic LEP ink onto a medium. In instances where the metallic LEP ink includes pigment exhibiting a silver appearance, the ink layer formed on the medium may have any desirable thickness and still have a brilliant silver appearance. In instances where the metallic LEP ink includes a combination of a pigment exhibiting a silver appearance and a pigment exhibiting a pearlescent optical property, the ink layer formed on the medium should be relatively thin, e.g., a thickness of 1 μm or less, so that the ink film will have both the brilliant silver appearance as well as the pearlescent appearance.

To further illustrate the present disclosure, examples are given herein. It is to be understood that these examples are provided for illustrative purposes and are not to be construed as limiting the scope of the present disclosure.

EXAMPLES

Example 1

An example of a silver base paste was formed by homogenizing a mixture of a silver dispersion and a transparent resin dispersion. The silver dispersion was formed by dispersing silver dollar aluminum pigment particles in ISOPAR® L. HP® Indigo transparent ink was used as the transparent resin dispersion, and the HP® Indigo transparent ink included a polymer dispersed in ISOPAR® L. Homogenization of the silver dispersion/transparent resin dispersion mixture was accomplished by shaking the mixture using a paint shaker at about 10 Hz for about 30 minutes.

Figure 4A:
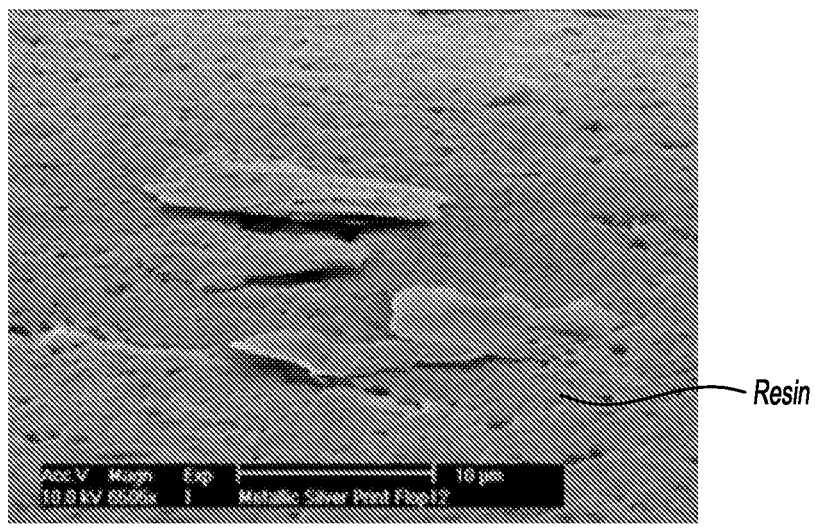
FIG. 4A is a scanning electron microscope (SEM) image of an example of a silver ink printed on a sheet of paper.

After homogenization, the newly formed silver base paste was diluted into a printable silver ink. A scanning electron micrograph (SEM) of the printable silver ink is shown in FIG. 4C. It was noted that the size of the pigments was between about 5 μm and about 10 μm, and that the shape of the pigments resembled the pigments as provided by Schlenk Metallic Pigments GmbH (Germany), the manufacturer of the pigments (see FIG. 4D). As such, the process described herein did not change the morphology of the pigments.

The silver ink was then printed on a sheet of paper using an HP® Indigo 7500 printing press. Then, a SEM image was taken of the printed silver ink, and this image is shown in FIG. 4A. The SEM image shows the resin of the silver ink, which was then-currently hiding the underlying aluminum pigment. An oxygen plasma etching process was then used to remove the resin layer, thereby exposing the underlying aluminum pigment particles. Another SEM image was taken after the resin layer was removed, and this image is shown in FIG. 4B.

Figure 4B:
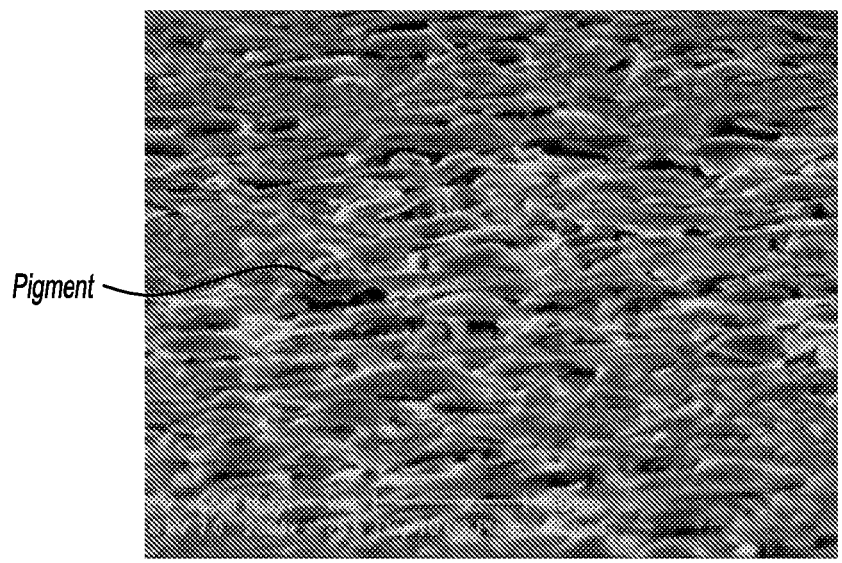
FIG. 4B is a SEM image of the example of the silver ink printed on the paper shown in FIG. 4A, but where resin of the silver ink was removed to expose underlying pigment particles.
Figure 4C:
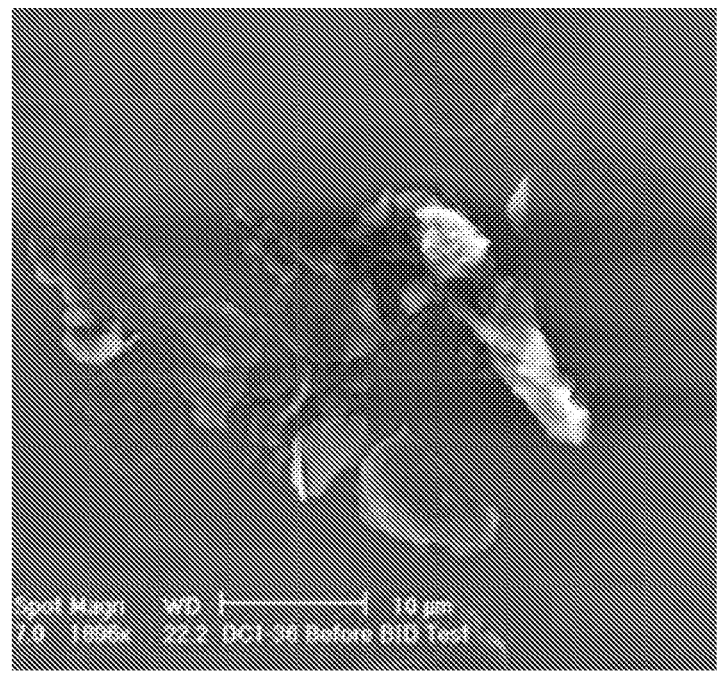
FIG. 4C is a SEM image of the silver ink after production and prior to printing.
Figure 4D:
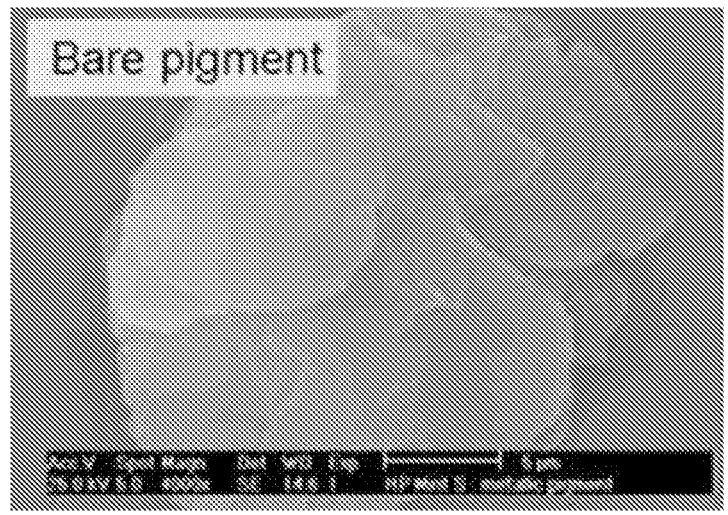
FIG. 4D is a SEM image of an example of a silver dollar aluminum pigment as provided by the pigment manufacturer.
Figure 5A:
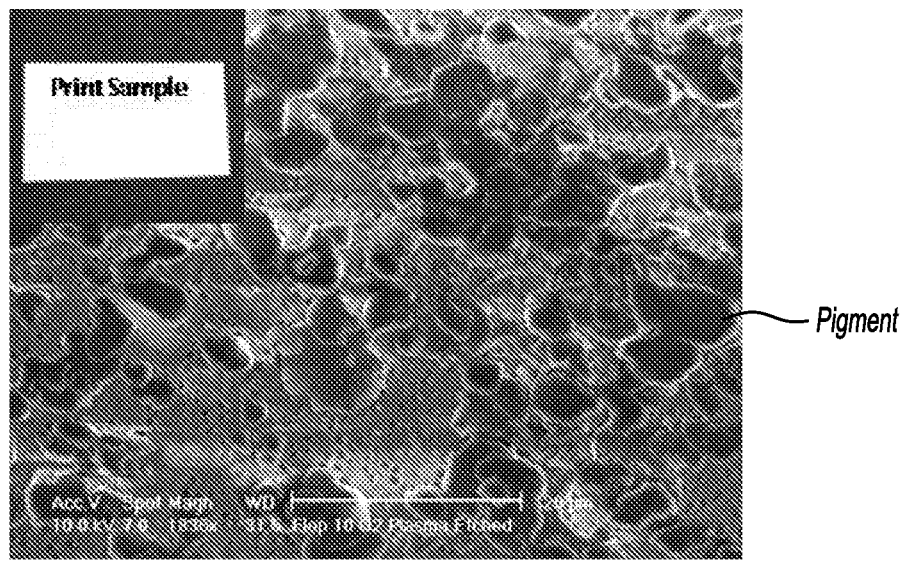
FIG. 5A is a SEM image of an example of a silver ink printed on a paper, where resin of the silver ink was removed to expose underlying pigment particles.

As shown in FIG. 4B, which was taken at an angle of about 30 degrees relative to the plane of the paper upon which the silver ink was printed, the aluminum pigment had a flat and substantially round morphology. This morphology matched the original morphology of the silver dollar aluminum pigment, where (as the name denotes) each pigment particle resembled a "silver dollar". The SEM image of the pigment as provided by the pigment manufacturer is shown in FIG. 4D. A comparison of FIGS. 4B, 4C, and 4D illustrates that the original "silver dollar" morphology was maintained throughout the process used to form the silver base paste and the silver ink.

As also shown in FIG. 4B, the aluminum pigment particles lie flat on the surface of the paper; i.e., in the same plane as the paper. In this orientation, a maximum amount of light will be able to reflect from the surfaces of the pigment particles. It has been found that this maximum light reflectance gives prints, including those formed by the silver ink of Example 1, their brilliant metallic appearance or shine.

The SEM images of FIGS. 4C and 4D also show that the particle size distribution of the pigment in the silver ink remained substantially the same as the particle size distribution of the pigments before processing (i.e., the pigments as provided by the pigment manufacturer). For instance, as shown from the SEM images of FIGS. 4C and 4D, the relative size of the pigments is substantially the same for both the as-received pigments (FIG. 4D) and the pigments in the silver ink (FIG. 4C).

Example 2

The silver base paste of Example 1 (referred to in this example as SBP1) and the printable silver ink of Example 1 (referred to in this example as Ink 1) were used in this Example. The silver ink (Ink 1) was printed on a sheet of paper using an HP® Indigo 7500 printing press. An oxygen plasma etching process was used to remove the resin layer from the print to expose the underlying aluminum pigment particles, and a SEM image of the print (with the resin layer removed) was taken. The SEM image is shown in FIG. 5A.

Figure 5B:
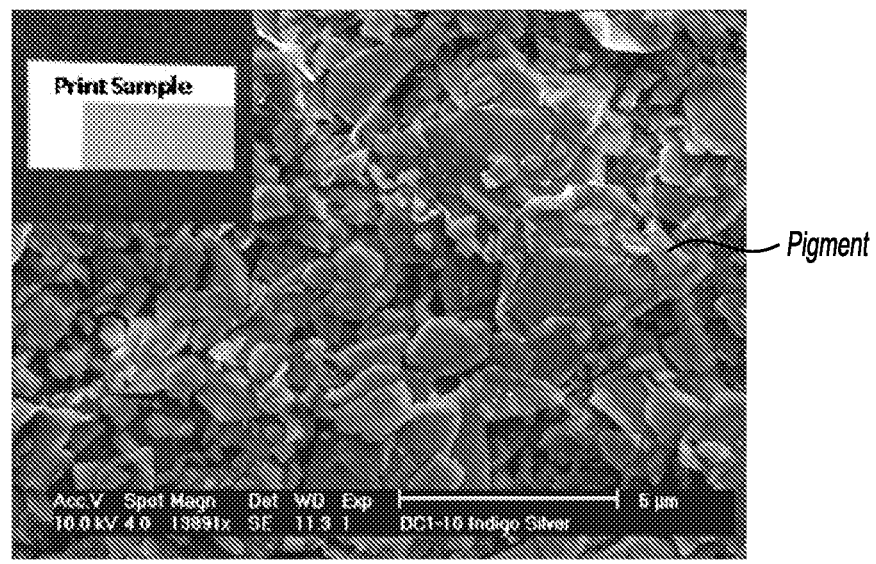
FIG. 5B is a SEM image of an example of a comparative silver ink printed on a sheet of paper, where the comparative silver ink includes a silver base paste formed using a microfluidization process.

A comparative silver base paste (SBP 2) was formed from the same silver dispersion and the same transparent resin dispersion used for the silver base paste SBP 1. However, for this comparative silver base paste SBP 2, homogenization was accomplished using microfluidization, which is a high shearing process. This comparative silver base paste SBP 2 was diluted into a printable ink (Ink 2), and Ink 2 was then printed on the same type of paper as the print formed with Ink 1. An oxygen plasma etching process was then used to remove the resin layer, thereby exposing the underlying aluminum pigment particles. A SEM image of the print formed with Ink 2 (after the resin layer was removed) was then taken. This SEM image is shown in FIG. 5B.

It was found that the pigment of Ink 2, (i.e., the pigment of the silver base paste SBP 2 processed utilizing the microfluidization technique) did not retain its original morphology. As shown in FIG. 5B, the morphology of the pigment particles included edges and sharp corners, which is in contrast to the original morphology of the silver dollar pigment which included rounded particles. In some instances, the pigment particles were at least partially re-shaped in a manner that prevented the particles from lying flat on the surface of substrate. This is also in contrast to the original morphology of the silver dollar pigment where the particles are flat discs. It is believed that maximum light reflection may not be achieved by the pigment particles of Ink 2 shown in FIG. 5B, at least because of the alterations in the pigment particle morphology that take place during processing of the comparative silver base paste SBP 2. These alternations may, in effect, extract from the brilliance of the metallic color of the print.

In contrast to Ink 2, the silver ink (Ink 1), which was formed from the silver base paste SBP 1 formulated using an example of the method of the present disclosure, includes pigment particles that have retained their original morphology. This is shown in FIG. 5A, where the silver dollar pigment particles resemble the flat and round discs or "silver dollars" of the pigment before processing.

Figure 6:
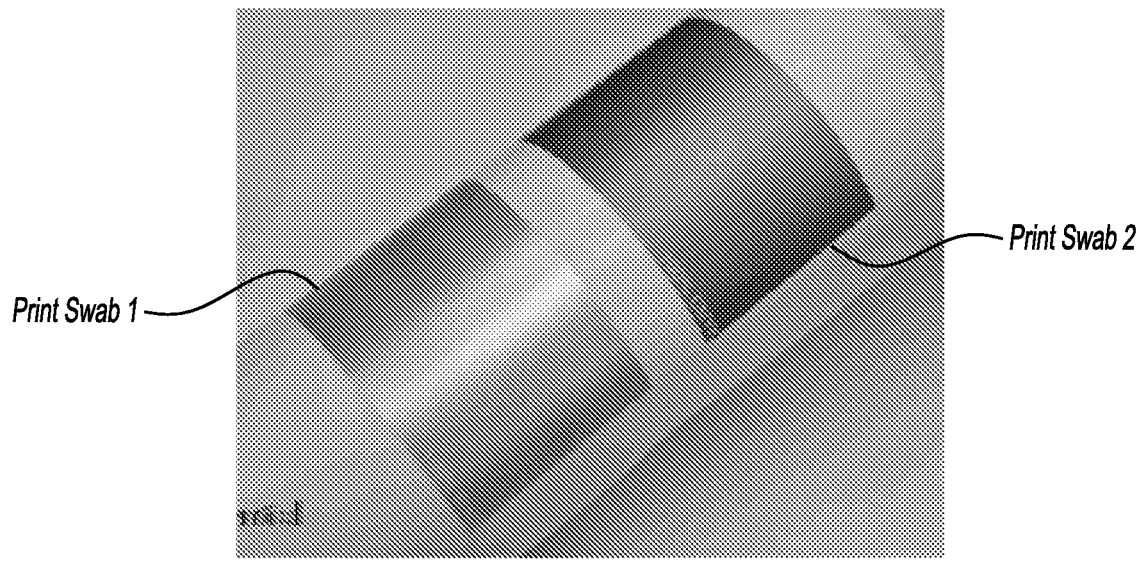
FIG. 6 is a photograph of a print swab of an example of a printable LEP ink produced using an example of the silver base paste of the present disclosure (Print Swab 1) and another print swab of an example of a printable LEP ink produced using an example of a comparative silver base paste formed using a microfluidization process (Print Swab 2)

Print swabs 1 and 2 of Inks 1 and 2, respectively, were then generated by printing Ink 1 (including paste SBP 1) and the comparative Ink 2 (including paste SBP 2) on a substrate. The print formed with Ink 1 (i.e., print swab 1) and the print formed with comparative Ink 2 (i.e., print swab 2) are both shown in FIG. 6.

Clearly, the print swab 1 has a clear, metallic shine, which is due to the pigment in Ink 1, which was formed from the silver base paste SBP 1. In contrast, the print swab 2 does not have the same metallic shine as the print swab 1, and it is believed that this is due to the breakdown of the pigment morphology of the pigment in comparative Ink 2. The breakdown of the pigment of Ink 2 was caused by the microfluidization technique used to process the silver base paste (SBP 2).

Example 3

Figure 7A:
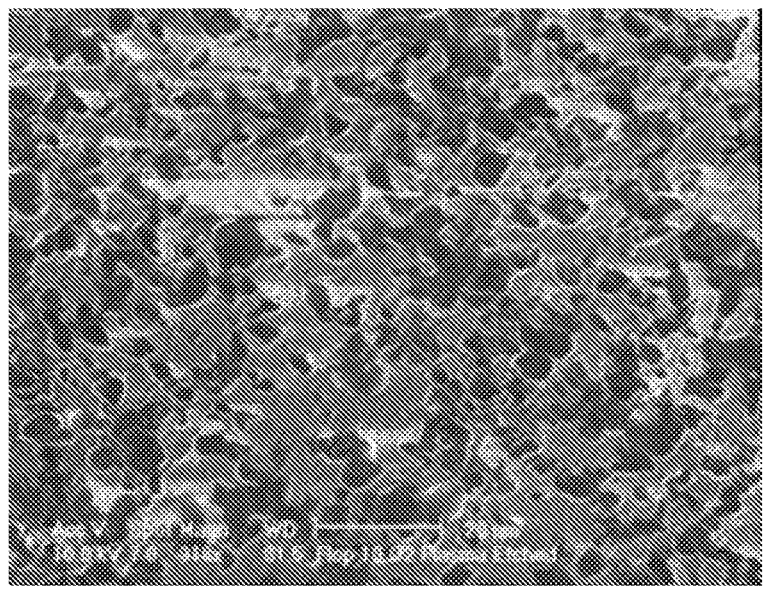
FIG. 7A is a SEM image of the same silver ink shown in FIG. 5A except the silver ink was non-digitally printed and is shown in FIG. 7A at a lower magnification.

The silver LEP ink formed in Example 1 (i.e., Ink 1 of Example 2) was again printed using an HP® Indigo 7500 printing press. An oxygen plasma etching process was used to remove the resin layer from the print to expose the underlying aluminum pigment particles, and a SEM image of the print (with the resin layer removed) was taken. The SEM image is shown in FIG. 7A.

Figure 7B:
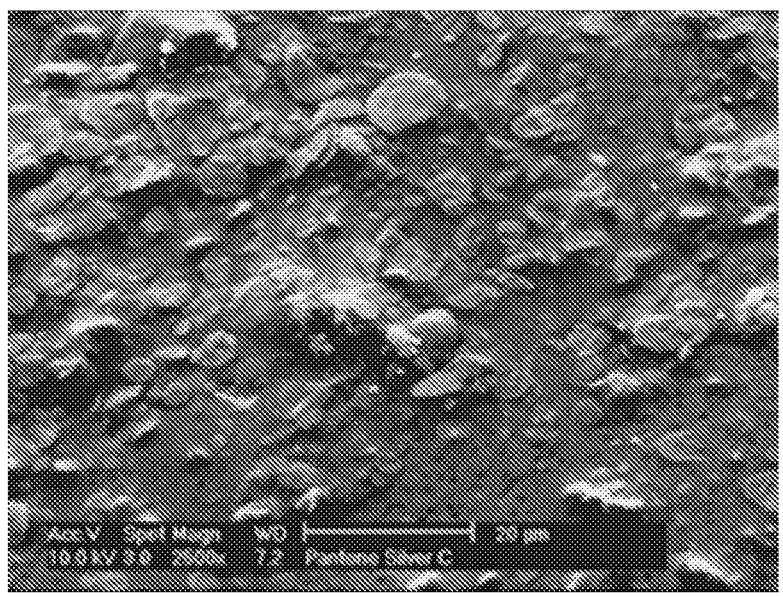
FIG. 7B is a SEM image of a Pantone® silver ink printed on a substrate to form a print.

A print of a Pantone® silver standard ink was obtained. This print was formed using traditional analog printing. A SEM image of the printed Pantone® silver ink is shown in FIG. 7B. From these SEM images, which are both top views of the printed inks, it can be seen that the morphology of the pigment particles of the silver ink (Ink 1 of Example 2, which included pigment particles that have retained their original flat and round morphology) matches the morphology of pigment particles of the Pantone® silver standard.

Example 4

A silver base paste was formed (e.g., as described in Example 1) and then was mixed with a colored paste to form a metallic LEP paste LEP 1. In this example, the colored paste was HP IndiChrome® Violet (available from Hewlett-Packard Indigo), which is a violet LEP paste including at least violet pigment incorporated into a non-aqueous vehicle. The ratio of the silver base paste to colored paste for the metallic LEP paste LEP 1 was about 9:1. The metallic LEP paste (LEP 1) was then diluted to about 1 wt % NVS with ISOPAR® L to produce a printable metallic LEP ink (Ink 3).

The silver base paste was also mixed with the colored paste described immediately above, but in different amounts than those used for LEP 1 to produce another metallic LEP paste, referred to as LEP 2. The ratio of the silver base paste to colored paste for the LEP paste LEP 2 in this example was about 8:2. The LEP paste (LEP 2) was then diluted to about 1 wt % NVS with ISOPAR® L to produce a printable LEP ink (Ink 4).

The silver base paste was further mixed with the colored paste described above, but yet in other different amounts than those used for LEP 1 and LEP 2 to produce another metallic LEP paste LEP 3. The ratio of the silver base paste to colored paste for the LEP 3 was about 7:3. The LEP paste (LEP 3) was then diluted to about 1 wt % NVS with ISOPAR® L to produce a printable LEP ink (Ink 5).

Figure 9:
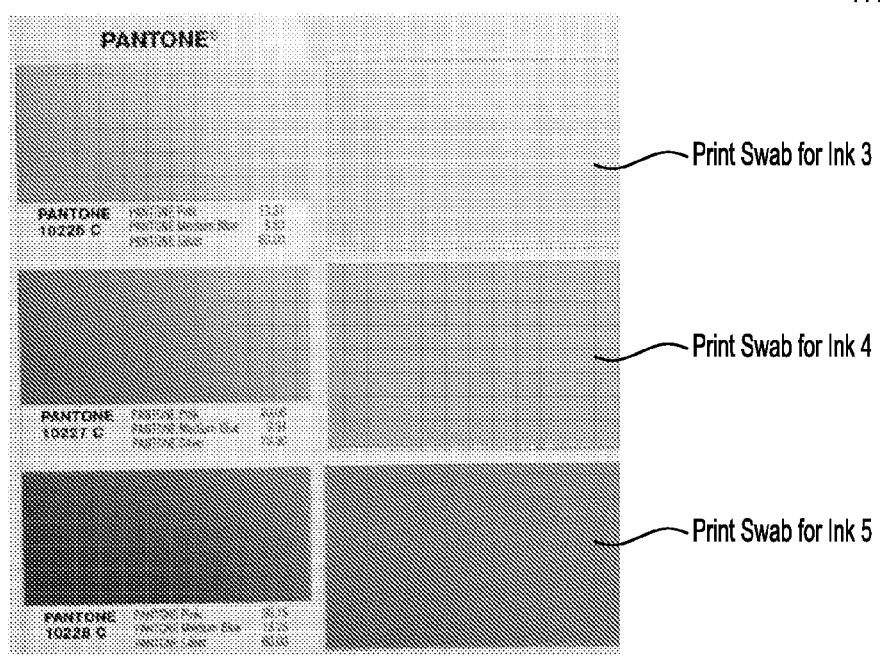
FIG. 9 is a photograph of print swabs produced from examples of a printable LEP ink having varying ratios of an example of the silver base paste and an example of a violet colored paste, each of the print swabs shown in the photograph substantially matches a respective Pantone® color standard.

Print swabs of each of the Inks 3, 4, and 5 were formed by printing the inks using an HP® Indigo 5500 printing press, and these print swabs are shown in FIG. 9. These print swabs show the varying degrees of the violet color produced by the different combinations of the silver base paste and the colored paste described above. FIG. 9 also shows that each of the Inks 3, 4, and 5 substantially matches a Pantone® color standard.

Example 5

Figure 10:
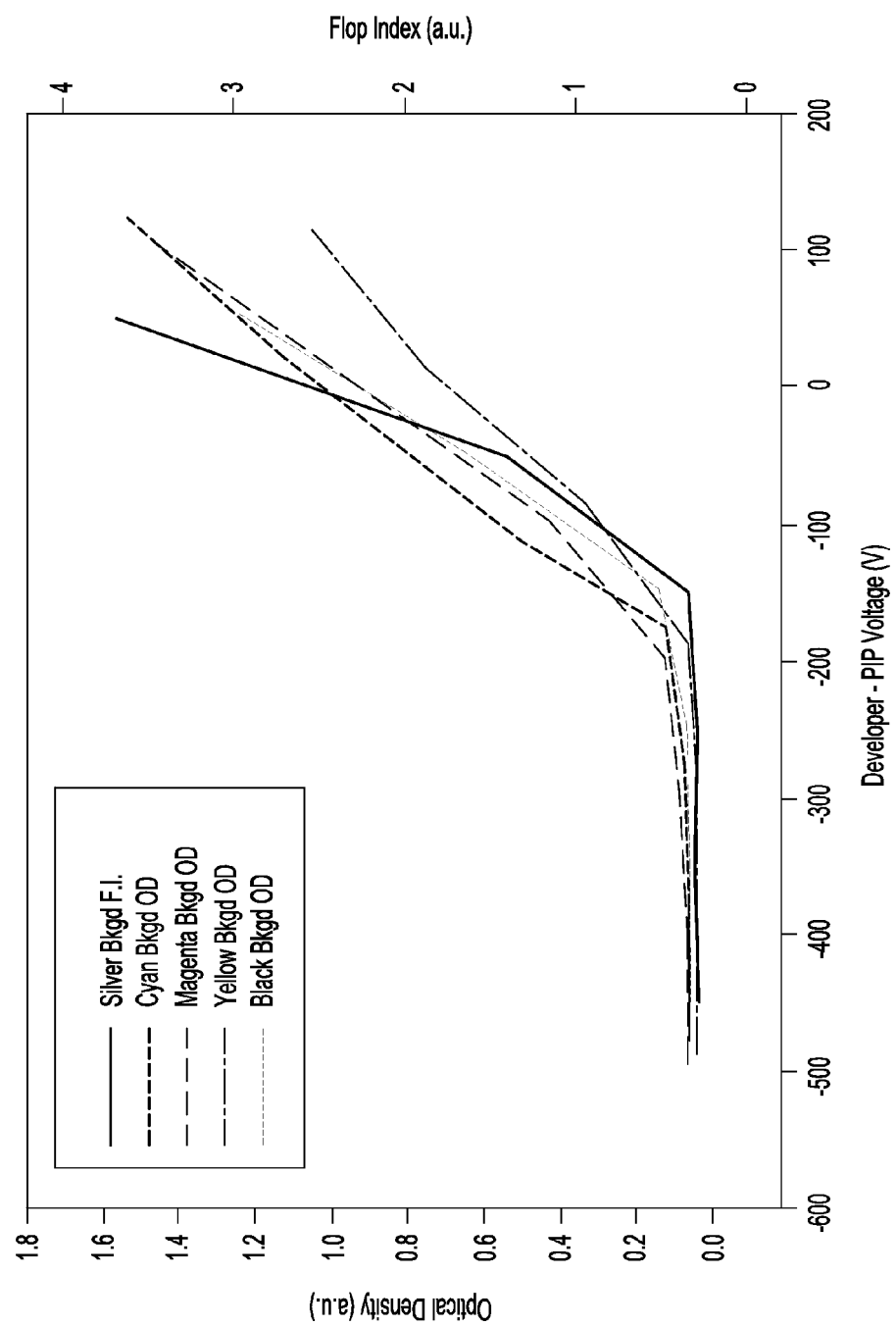
FIG. 10 is a graph showing optical density measurements of examples of cyan, magenta, yellow, and black HP ElectroInks® relative to developer-photo imaging plate (PIP) voltage and flop index measurements of an example of a silver LEP ink formed with the silver base paste according to the present disclosure relative to developer-photo imaging plate (PIP) voltage.

Flop index and optical density may be used to evaluate the look of prints formed with reflective inks, and optical density may be used to evaluate the look of prints formed with inks that absorb light. Flop index and optical density measurements of the example of the silver metallic LEP ink (formed in Example 1 and referred to as Ink 1 in Example 2) including silver base paste were taken at various LEP developer-PIP voltages, and the flop index measurements were plotted in the graph shown in FIG. 10. It is noted that the optical density measurements have been removed for simplicity. Optical density measurements of a cyan HP ElectroInk®, a yellow HP ElectroInk®, a magenta HP ElectroInk®, and a black HP ElectroInk® were also taken at various LEP developer-PIP voltages, and the measurements were also plotted in the graph shown in FIG. 10. From this data, it was found that all of the ElectroInks® measured followed the same trend, i.e., there was practically no ink development at any of the developer-photo imaging plate (PIP) voltages between −500 V to −200 V. At voltages greater than −200 V, the ElectroInks® began to develop, and these developments were detected by the optical density measurements of the ElectroInks®. It is also shown that the silver metallic LEP ink behaved similarly to the several HP® ElectroInk examples; i.e., the silver metallic LEP ink followed the same trend as the ElectroInks®. This is particularly true when the relative developer voltage approaches the voltage of the surface of the photoconductor/PIP (e.g., 1040 shown in FIG. 8). It has been found that this desirable behavior (i.e., similar to that of the ElectroInks®) is achievable by examples of the metallic inks as disclosed herein. It is believed that this behavior is not generally achievable with all metallic inks.

The examples described hereinabove may be used to formulate a base paste containing pigment particles having their original morphology. When the base paste is a silver base paste, the silver base paste may be a silver LEP paste, and this may then be diluted to form a printable silver LEP ink. The silver base paste may otherwise be mixed with a colored paste to form a colored LEP paste, and the colored LEP paste then may be diluted to form a printable colored metallic LEP ink. The silver LEP ink or the colored LEP ink, which may also be referred to as a liquid toner, exhibits a metallic shine/sheen and a metallic reflection with a strong specular reflectance having the brilliance of silver. It is believed that this is due to the retained original morphology of the pigment of the base paste. As mentioned above, the original morphology of the pigment may be retained in the base paste during the gentle, non-impact processing method used to form the base paste. In addition to the gentleness of the processing method, a high throughput of paste may be formed in a relatively short amount of time. For instance, the production time for forming the base paste is about 12 kilograms per hour depending, at least in part, on the processing time of the silver dispersion and the transparent resin dispersion used to form the base paste. Further, the production time may vary depending on the production scale and the capacity of the processing equipment. In one example, processing time may vary by about 5 minutes per 100 kilograms of paste.

It is to be understood that the ranges provided herein include the stated range and any value or sub-range within the stated range. For example, a range from about 100 nm to about 250 nm should be interpreted to include not only the explicitly recited limits of about 100 nm to about 250 nm, but also to include individual values, such as 100 nm, 150 nm, 210 nm, etc., and sub-ranges, such as from about 120 nm to about 200 nm, from about 150 nm to about 245 nm, etc. Furthermore, when "about" is utilized to describe a value, this is meant to encompass minor variations (up to +/−15%) from the stated value.

While several examples have been described in detail, it will be apparent to those skilled in the art that the disclosed examples may be modified. Therefore, the foregoing description is to be considered non-limiting.

What is claimed is:

1. A method of making a liquid electrophotographic (LEP) paste, comprising:

making a silver base paste by:
- forming a silver dispersion of a colorant and a non-polar carrier, the colorant being chosen from i) a pigment having a silver appearance or ii) a combination of the pigment having the silver appearance and an other pigment having a pearlescent optical property;
- adding a transparent resin dispersion to the silver dispersion to form a dispersion mixture, the transparent resin dispersion including a polymer dispersed in a non-aqueous carrier; and
- homogenizing the dispersion mixture, the homogenizing being accomplished via a non-impact homogenization process operating at a frequency of less than or equal to 1 kHz; and mixing a predefined ratio of the silver base paste and a colored paste, thereby producing the LEP paste which exhibits a color that matches an industrial color standard when formed into a final printable ink.

2. The method as defined in claim 1 wherein the forming of the colorant dispersion and the adding of the transparent resin dispersion are performed at the same time.

3. The method as defined in claim 1 wherein the colored paste contains charged pigment particles incorporated in a non-aqueous vehicle.

4. The method as defined in claim 1 wherein the pigment having the silver appearance is chosen from aluminum pigment particles, encapsulated aluminum pigment particles, aluminum pigment flakes, and aluminum pigment powders.

5. The method as defined in claim 1 wherein the non-aqueous carrier and the non-polar carrier are individually chosen from isoparaffinic hydrocarbons, paraffinic hydrocarbons, aliphatic hydrocarbons, de-aromatized hydrocarbons, halogenated hydrocarbons, cyclic hydrocarbons, and functionalized hydrocarbons.

6. The method as defined in claim 1 wherein the mixing is accomplished for a period of time that is based on a total amount of non-volatile solids present in the LEP paste and the colored paste, and wherein the LEP paste has a non-volatile solids content ranging from about 20% to about 35%.

* * * * *